Dec. 29, 1953     T. E. WEICHSELBAUM     2,664,403
METHOD OF PREPARING HEMATIN STANDARDIZED REAGENT
Filed June 25, 1951

INVENTOR
THEODORE E. WEICHSELBAUM

BY *Alfred W. Petchaft*

ATTORNEY

Patented Dec. 29, 1953

2,664,403

UNITED STATES PATENT OFFICE

2,664,403

METHOD OF PREPARING HEMATIN STANDARDIZED REAGENT

Theodore E. Weichselbaum, Normandy, Mo., assignor to A. S. Aloe Company, St. Louis, Mo., a corporation of Missouri Continuation of application Serial No. 778,691, October 8, 1947. This application June 25, 1951, Serial No. 233,465

2 Claims. (Cl. 252—408)

This invention relates to certain new and useful improvements in methods of preparing quantitative laboratory standards of the type used in clinical chemistry for verifying and correcting instrument calibration tables and graphs. This application is a continuation of my co-pending application Serial No. 778,691, filed October 8, 1947, now abandoned, for Methods of Performing Routine Laboratory Analysis, which application will now be permitted to lapse without prejudice in view of its being superseded by this present application.

At the present time, in the performance of many routine analyses, clinical laboratories make use of physical colorimetry and spectrophotometry as well as the practice of various related technics, such as those requiring the employment of photoelectric instruments and those involving titrimetry. Analyses of this character have exceedingly broad application and in the physiological field, for diagnostic purposes, are extensively used in the analysis of body fluids such as blood serum and plasma, urine, and spinal fluid. Such procedures, although routine or research in nature, normally require painstaking and laborious preliminary steps, including the exacting preparation of quantitative standards for color comparison purposes and for checking the accuracy of the instruments utilized so that any deviations in the operation thereof will be precisely adjusted for by calibration. Customarily, whatever excess may remain of these standards after the accomplishment of the color comparison or the instrument verification or correction procedure will usually be discarded since same are subject to deterioration, inadvertent dilution or contamination and, thus, their further use at a later date will be productive of inaccuracy. Consequently, it is necessary to prepare such standards immediately prior to their use. This procedure is manifestly inherently uneconomical and, furthermore, demands an element of proficiency on the part of the operator in preparing the standard since any errors in the formation thereof will perforce cause the determination of false results.

Furthermore, the preparation of many of such standards are most intricate and thereby demand marked skill and wide experience on the part of the technician. It is evident that the amount of time spent by skilled personnel in preparing such reagents constitutes a severe lack of economy of such individuals' time since it diverts them from their immediate research pursuits and thereby causes devotion of a considerable portion of their time on merely ancillary preparatory steps. With the developing shortage of highly trained scientific personnel, it is readily recognized that their efforts should at all times be directed solely to the problem at hand and not dissipated on preparatory procedures.

Therefore, it is a primary object of the present invention to provide a method of preparing quantitative laboratory standards incorporating the preparation of a dried, solid reagent of predetermined weight which may be dissolved in a selected diluent to form a standard of predetermined concentration suitable for accurate quantitative measurement.

It is a further object of the present invention to provide a method for preparing quantitative laboratory standards which comprises the desiccation of a predetermined quantity of a solution of known concentration and the maintenance of such desiccated portion under conditions wherein it will retain its properties indefinitely.

It is an additional object of the present invention to provide a method for preparing quantitative laboratory standards which may be accurately and reliably performed by relatively unskilled operators.

It is a still further object of the present invention to provide a method of preparing quantitative laboratory standards which is highly economical, simple in performance, and convenient.

With the above and other objects in view, my invention resides in the novel methods and processes presently described and pointed out in the claims.

In the accompanying drawing—

Figures 1, 2:
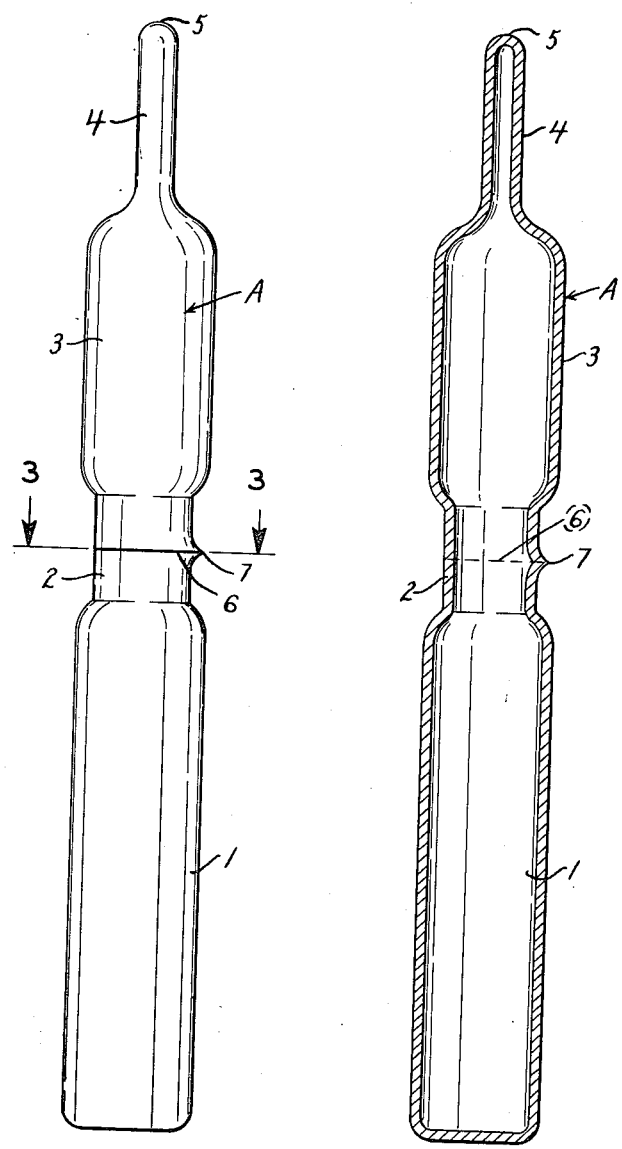
Figure 1 is a side elevational view of a preferred form of reagent ampule for use in the performance of the method of the present invention.
Figure 2 is a vertical cross-sectional view of the ampule shown in Figure 2.
Figure 3:
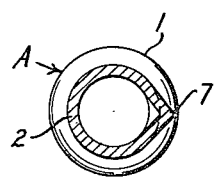
Figure 3 is a horizontal sectional view taken along line 3—3 of Figure 1.

The method herein comprises the formation of a solution of desired concentration; the measuring of a predetermined quantity of the prepared solution and the depositing of the same within an ampule or other enclosable container; the dehydration or desiccation of the measured quantity in the ampule by any suitable means, such as by evaporation or by lyophilization, as in the manner set forth in United States Letters Patent No. 2,225,774, issued to E. W. Flosdorf, December 24, 1940; the sealing of the ampule under vacuum; and the ultimate utilization of the wholly dried, solid reagent by rupture of the ampule and dissolution of the dried reagent in a predetermined quantity of selected diluent to reconstitute a quantitative standard of known concentration.

Referring now in more detail, and by reference characters to the drawing, which illustrates a practical type of ampule for use in the method herein taught, but is not a part of the present invention, A designates a blown or drawn glass ampule of essentially tubular form and integrally comprising a lower or body portion 1, an intermediate or constricted portion 2, and an upper portion 3 preferably of substantially the same diametral size as the body portion 1, tapering at its upper end into an axially upwardly projecting sealing neck 4, the latter being initially open for filling purposes and, subsequent to filling, being sealed, as at 5, in a hot flame, such as a Bunsen burner or blow lamp. The constricted portion 2 is provided, midway of its length, with a line of weakness or scratch line 6, and a small outwardly blown or drawn nipple-like protuberance 7, the apex or point of which is coincident with the scratch line 6.

In the performance of the method of this invention, the reagent ampule A is filled with an accurately measured or weighed quantity of reagent having a precisely determined concentration suitable for making a reagent solution of definite strength or "normality" when added to a stated quantity of distilled water or other diluent. The quantity of reagent thus deposited is dehydrated for reduction to a completely dried, solid state. This may be accomplished by lyophilization wherein the sealing neck 4 which is, as yet, still open, is connected by suitable rubber tubing to a high vacuum system (not shown), which may be of any conventional design or construction and the contents of the ampule desiccated by freezing the liquid contents and conducting desiccation by sublimation. This method is particularly advantageous in dealing with various types of biological reagents which must be handled very carefully to avoid impairment of their action. After the product has been completely desiccated, the sealing neck 4 is sealed off and the product is completed, ready for labeling and final use. The precise conditions of such dehydration methods depend upon the character of the particular standard being prepared as some will require low temperature desiccation whereas others are reduced to a dry state by high temperature vacuum procedures.

In some cases, such as with a bilirubin standard, lyophilization is not used but the dehydration process is carried out by evaporation procedure with sealing of the desiccated material in an inert atmosphere, as will presently be more fully described. The manner of desiccation is thus dependent upon the particular substances involved.

Reagents so ampulized in wholly desiccated state will keep for indefinite periods without deterioration, remaining stable as to their original properties, so that an operator may use same, as will be shown below, whenever the particular occasion arises without fear of any inaccuracy resulting through untoward impairment of the reagent.

When the operator desires to make a quantitative laboratory standard for clinical analytical purposes, the ampule A is manually broken along the scratch line 6 into two sections, and the contents washed by a small quantity of the indicated diluent into the container in which such standard is to be made. It is to be particularly noted that exact quantitative transfer of the ampule contents must be made. Therefore, the desiccated material in both of the sections of the now broken ampule must be completely dissolved and transferred. The rupturing of the ampule A along the scratch line 6 will result in the formation of a pouring lip to facilitate transference of the dissolved reagents into the container in which the standard is being made. Successive washings from a conventional laboratory wash bottle, or the like may be done to assure that all desiccated material has been totally dissolved and transferred. The solution is then made up to the predetermined or stated volume.

The quantitative standards so prepared by the present invention are particularly fitted for utilization in verifying the calibration tables and graphs of photoelectric colorimeters and spectrophotometers, as well as providing color standards for visual colorimetry and for titrimetric technics. As illustrative of the method herein described, below are presented two specific examples of the preparation of a quantitative standard for checking the accuracy of the type of calibration table supplied with a pre-calibrated spectrophotometer or of a transmittance-concentration graph.

*Example I*

The preparation of a hematin standard for use in the alkaline hematin technic for determining total hemoglobin is readily accomplished by this method. Although hematin standards of various concentrations may, of course, be prepared, the example herewith relates to one representing 18.7 grams per cent hemoglobin equivalent. A one liter solution is formed by dissolving 2.776 grams of hematin in a .2 molar borate buffer, pH 9.4. After incubation and aging of the reagent thus made, 5 cc. thereof, containing a proportionate amount of hematin, namely 13.88 mg., is deposited into the ampule A through the now open sealing neck 4. The 5 cc. of reagent is then subjected to lyophilization which comprises shell freezing by immersion of the ampule A into a suitable bath, such as isopropyl alcohol at −40° C. Subsequent to the freezing step, and before thawing can occur, a high vacuum is applied in order to evacuate all water thereby leaving the reagent in a completely desiccated, solid form. The ampule A is then sealed under vacuum.

To reconstitute the reagent for analytical use, the ampule A is broken along the line of weakness 6, and small amounts of distilled water, in the neighborhood of 10 ml., are deposited in the upper and lower portions 1, 3, of the ampule A for dissolving the solid reagent. Thereon the portions 1, 3, are emptied into a 250 cc. flask. However, additional flushings of the ampule A may be made to assure quantitative dissolution of the entire reagent. The flask is then made up to the mark with the diluent, namely, .2 molar borate buffer pH 9.4, to constitute a standard of accurate known strength, suitable for use as a standard in visual colorimetry and for use as a standard for calibration of verification of photoelectric and spectrophotometric curves or calibration tables. As a verification standard, it has a transmittance equivalent to 18.7 grams per cent hemoglobin.

*Example II*

To prepare protein standards for use in determining the total protein and albumin content of blood, plasma is extracted from whole beef blood and the protein content thereof discovered by conventional technics. The beef plasma is then diluted with a saline solution, namely, .85 per cent sodium chloride, in requisite amount to provide 360 mg. of protein per 5 cc. Then 5 cc. of the reagent thus formed is deposited in the ampule A and subjected to shell freezing and desiccation, after which the ampule A is sealed under vacuum. The solid reagent within the ampule A represents 9 grams per cent total serum protein equivalent. To reconstitute the reagent, the ampule A is broken and flushed repeatedly with small amounts of the diluent, which in this case is 30 per cent urea-thymol reagent, until the reagent is completely quantitatively dissolved, with transference being made to a 100 ml. volumetric flask. The diluent is then added to the flask to make up to the mark. Various concentrations of protein standard reagents may be made by this method, such as, one containing 280 mg. per 100 ml. which represents 7 grams per cent total protein material or one of the concentration of 160 mg. per 100 ml., which represents 4 grams per cent total serum protein equivalent, and being suitable for use in colorimetry and for calibration for verification of photoelectric and spectrophotometric curves or calibration tables.

Thus, by standards of the type above set forth, a technician may accordingly verify or correct calibration tables to assure accurate quantitative measurement.

The preparation of a bilirubin standard for use in quantitatively determining the presence of this bile pigment in serum or plasma, will serve as an example of the preparation of a reagent by evaporation. In this instance, a solution is made by dissolving 20 mg. bilirubin in 100 cc. of chloroform. Then 5 cc. of the reagent thus formed is deposited in the ampule A and subjected to evaporation to provide 1 mg. of bilirubin in a dry, solid state, after which the ampule A is sealed in an inert atmosphere, with nitrogen being the gas used. Thus, the air in the ampule is replaced by nitrogen, the presence of which will prevent oxidation of the bilirubin to biliverdin. The reagent is reconstituted for chemical and clinical analytical use by breaking the ampule A and dissolving completely the desiccated bilirubin with small amounts of chloroform, and then quantitatively transferring the dissolved bilirubin by methyl alcohol to a 100 cc. volumetric flask. Methyl alcohol is then added to the flask to make up to the mark. As described hereinabove, it is understood that both sections of the broken ampule may be repeatedly washed to assure exact and precise dissolution of all bilirubin. The total amount of diluent utilized is roughly 95 per cent methyl alcohol and 5 per cent by volume chloroform. The solution so formed represents 1 mg. per cent bilirubin equivalent and will accordingly provide accurate light transmittance for such concentration to serve as a reliable working standard.

It should be understood that the present invention resides in the unique method of providing dry, solid reagents of known strength from a solution of predetermined concentration, which reagent is adapted for reconstituting a solution of the identical concentration at a subsequent time for quantitative measurement purposes in chemical and clinical analysis.

It is, of course, apparent that the present method is equally designed for use by physicians, analytical chemists, and laboratory technicians in both the medical and industrial fields, and obviously does not require developed skill on the part of the operator. Thus, relatively untrained assistants may perform the method of the present invention without substantial hazard of preparing an incorrect standard. The economy in material, time, and labor implicit in the practice of the method is apparent.

It should be understood that changes and modifications in the methods above set forth and in the various steps of their production may be made and substituted for those herein shown and described without departing from the nature and principle of the present invention.

Having thus described my invention, what I claim and desire to secure by Letters Patent is:

1. The method of making a hematin standardized reagent for use in colorimetry and in checking the accuracy of spectrophotometric calibration tables which method comprises placing an accurately measured quantity of hematin in a measured quantity of borate buffer solution to provide a liquid reagent of predetermined concentration, placing an accurately measured quantity of the so-formed liquid reagent within an enclosable container, freezing the liquid reagent within the enclosable container, subjecting the frozen material to a high vacuum system for complete desiccation of the reagent to provide a solid standardized reagent, then closing the container, opening the container at the time of preparation of the standard, and depositing the entire contents of the container into an accurately measured and predetermined quantity of a borate buffer solution in order to reconstitute the liquid reagent in its original strength.

2. The method of making a hematin standardized reagent for use in colorimetry and in checking the accuracy of spectrophotometric calibration tables which method comprises dissolving an accurately measured quantity of crystalline hematin in a measured quantity of borate buffer solution having pH 9.4 to provide a liquid reagent of predetermined concentration, depositing an accurately measured quantity of the so-formed liquid reagent within an enclosable container, freezing the liquid reagent within the enclosable container, subjecting the frozen material to a high vacuum system for complete desiccation of the reagent to provide a solid standardized reagent, then closing the container, opening the container at the time of preparation of the standard, dissolving the solid reagent in a small amount of distilled water, and then depositing the dissolved reagent into an accurately measured and predetermined quantity of borate buffer solution in order to reconstitute the liquid reagent in its original strength.

THEODORE E. WEICHSELBAUM.

References Cited in the file of this patent

UNITED STATES PATENTS

| Number | Name | Date |
|---|---|---|
| 1,680,616 | Horst | Aug. 14, 1928 |
| 2,225,774 | Flosdorf | Dec. 24, 1940 |
| 2,283,262 | Kamlet | May 19, 1942 |
| 2,440,315 | Tuve | Apr. 27, 1948 |

OTHER REFERENCES

"How to Make Standard Volumetric Solutions in a Few Minutes," E. H. Sargent & Co., Chicago, Ill., 4 pg. pub.